(12) United States Patent
Onodera

(10) Patent No.: US 7,098,415 B2
(45) Date of Patent: Aug. 29, 2006

(54) SWITCH APPARATUS WITH OPERATING KNOB WITH LIMITING ELEMENT FOR CONTINUED ENGAGEMENT

(75) Inventor: Hideji Onodera, Tokyo (JP)

(73) Assignee: Niles Parts Co., Ltd., Tokyo (JP)

( * ) Notice: Subject to any disclaimer, the term of this patent is extended or adjusted under 35 U.S.C. 154(b) by 0 days.

(21) Appl. No.: 11/004,996

(22) Filed: Dec. 7, 2004

(65) Prior Publication Data

US 2005/0092591 A1    May 5, 2005

Related U.S. Application Data

(63) Continuation of application No. 10/373,066, filed on Feb. 26, 2003, now Pat. No. 6,884,954.

(30) Foreign Application Priority Data

Feb. 27, 2003    (JP)    ............ P2002-052103

(51) Int. Cl.
*H01H 21/36*    (2006.01)
(52) U.S. Cl. ............ 200/330; 200/339
(58) Field of Classification Search ............ 200/561, 200/339, 315, 330, 332.1
See application file for complete search history.

(56) References Cited

U.S. PATENT DOCUMENTS

| | | | |
|---|---|---|---|
| 3,993,881 A | 11/1976 | Marsilio | 200/339 |
| 4,816,631 A | 3/1989 | Yamashita et al. | 200/339 |
| 5,239,143 A | 8/1993 | Valenzona | 200/339 |
| 5,647,478 A | 7/1997 | Hirai | 200/339 |

FOREIGN PATENT DOCUMENTS

JP    9-167543 A1    6/1997

*Primary Examiner*—Renee Luebke
(74) *Attorney, Agent, or Firm*—Rader, Fishman & Grauer PLLC; Ronald P. Kananen

(57) ABSTRACT

A switch apparatus, comprising an operating knob having a knob-leg with a bifurcation formed in the knob-leg, the operating knob being supported so that the operating knob can be operated to rock; and a slide switch having an engagement portion insertable in the bifurcation formed in the knob-leg so as to engage the bifurcation; wherein when the operating knob is operated to rock, the engagement portion receives a force from the bifurcation through the rocking movement to operate the slide switch; and wherein the slide switch has a limiting element that maintains the knob-leg in engagement with the engagement portion so that the knob-leg is prevented from disengaging from the engagement portion.

4 Claims, 7 Drawing Sheets

(a)

(b)

(c)

(a)

(b)

(c)

SWITCH APPARATUS WITH OPERATING KNOB WITH LIMITING ELEMENT FOR CONTINUED ENGAGEMENT

The present application is a continuation of U.S. patent application Ser. No. 10/373,066, filed on Feb. 26, 2003, now U.S. Pat. No. 6,884,954 the entire contents of which are incorporated herein by reference.

BACKGROUND OF THE INVENTION

1. Field of the Invention

The present invention relates generally to switches. In particular, the present invention relates to a switch apparatus used as, for example, a power window switch for an automobile.

2. Description of the Related Art

FIGS. 10 and 11 illustrate a conventional switch apparatus as disclosed, for example, in Japanese Patent Laid-Open No. 9-167543. FIG. 10(a) is an exploded perspective view of the conventional switch apparatus with some parts omitted. FIG. 10(b) is a side view. FIG. 10(c) is a cross-sectional view with some parts omitted, taken along line SA—SA of FIG. 10(b).

As shown in FIG. 10, a switch apparatus 201 has a knob-mounting portion 205 formed on the top of a case 203. An operating knob 209 is supported so that it rocks back and forth on a support pin 207 of the knob-mounting portion 205. The operating knob 209 has a knob-leg 211 that is inserted into the case 203. The lower end of the knob-leg 211 engages an engagement portion 215 of the slide switch 213 disposed in the case 203. A light source 217 is provided in the case 203 as shown, for example, in FIG. 10(c). The operating knob 209 has an indicator through which the light of the light source 217 transmits, so that the indicator can be visually recognized easily even at night.

For example, FIG. 11 illustrates the relation between the slide switch 213 and the knob-leg 211. FIG. 11(a) is an exploded perspective view of a pertinent portion, illustrating the relation between the slide switch and the knob-leg when they engage each other. FIG. 11(b) is a side view of the pertinent portion, illustrating the slide switch and the knob-leg. FIG. 11(c) is a front view of the pertinent portion, illustrating the slide switch and the knob-leg.

The knob-leg 211 is provided with a bifurcation 219 for engaging a later described element. The slide switch 213 has an operating boss 221 that is supported by the case 203 and serves as an engagement portion with which the bifurcation 219 of the knob-leg 211 is engaged.

When the operating knob 209 is operated in a rocking manner, the operating boss 221 receives a force from the bifurcation 219 through the rocking movement, the force being oriented in one of directions shown by arrow A in FIG. 11(b). Thus, the operating boss 221 operatively slides in one of directions shown by arrow B in FIG. 11(a) so that the slide switch 213 is switched. Thus, the operation of the operating knob 209 in a rocking manner allows easy switching of the slide switch 213 through the knob-leg 211.

However, with the aforementioned construction, there is a possibility of the knob-leg 211 disengaging from the operating boss 221 as shown in FIG. 11(c) due to warning of the knob-leg 211, so that the slide switch 213 cannot be properly operated.

To solve this problem, the rigidity of the knob-leg 211 may be increased by increasing the thickness of the knob-leg 211, thereby restricting the warning of the knob-leg 211 to prevent the knob-leg 211 from disengaging from the operating boss 221.

When the light source 217 disposed in the case 203 illuminates the operating knob 209 as shown in FIG. 10(c), an increased thickness of the knob-leg 211 may block the light emitted from the light source 217. Therefore, there is a possibility of the operating knob 209 not being illuminated sufficiently.

SUMMARY OF THE INVENTION

An object of the present invention is to provide a switch apparatus in which a simple structure prevents the knob-leg from disengaging from a slide switch without increasing the thickness of the knob-leg.

To accomplish these and other objects of the invention, a switch apparatus is provided including an operating knob having a knob-leg with a bifurcation formed therein, the operating knob being supported so that the operating knob can be operated to rock; and a slide switch having an engagement portion that engages the bifurcation formed in the knob-leg. When the operating knob is operated to rock, the engagement portion receives a force from the bifurcation through the rocking movement to operate the slide switch. The invention is characterized in that the slide switch has a limiting element that maintains the knob-leg in engagement with the engagement portion so that the knob-leg is prevented from disengaging from the engagement portion.

According to another aspect of the invention, the limiting element is a limiting wall that opposes an end of the engagement portion and extends in a direction substantially parallel to a plane in which the knob-leg swings, and the limiting wall is spaced from an end of the engagement portion by a distance shorter than a width of the knob-leg.

According to another aspect of the invention, the engagement portion projects toward the knob-leg, and the limiting wall includes opposed wall elements between which the engagement portion is disposed such that opposite ends of the engagement portion face the wall elements.

According to another aspect of the invention, the engagement portion projects substantially normal to a plane in which the knob-leg swings, and the limiting wall opposes a free end of the engagement portion.

According to another aspect of the invention, the limiting element is provided on the engagement portion.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

First Embodiment

Figure 1:
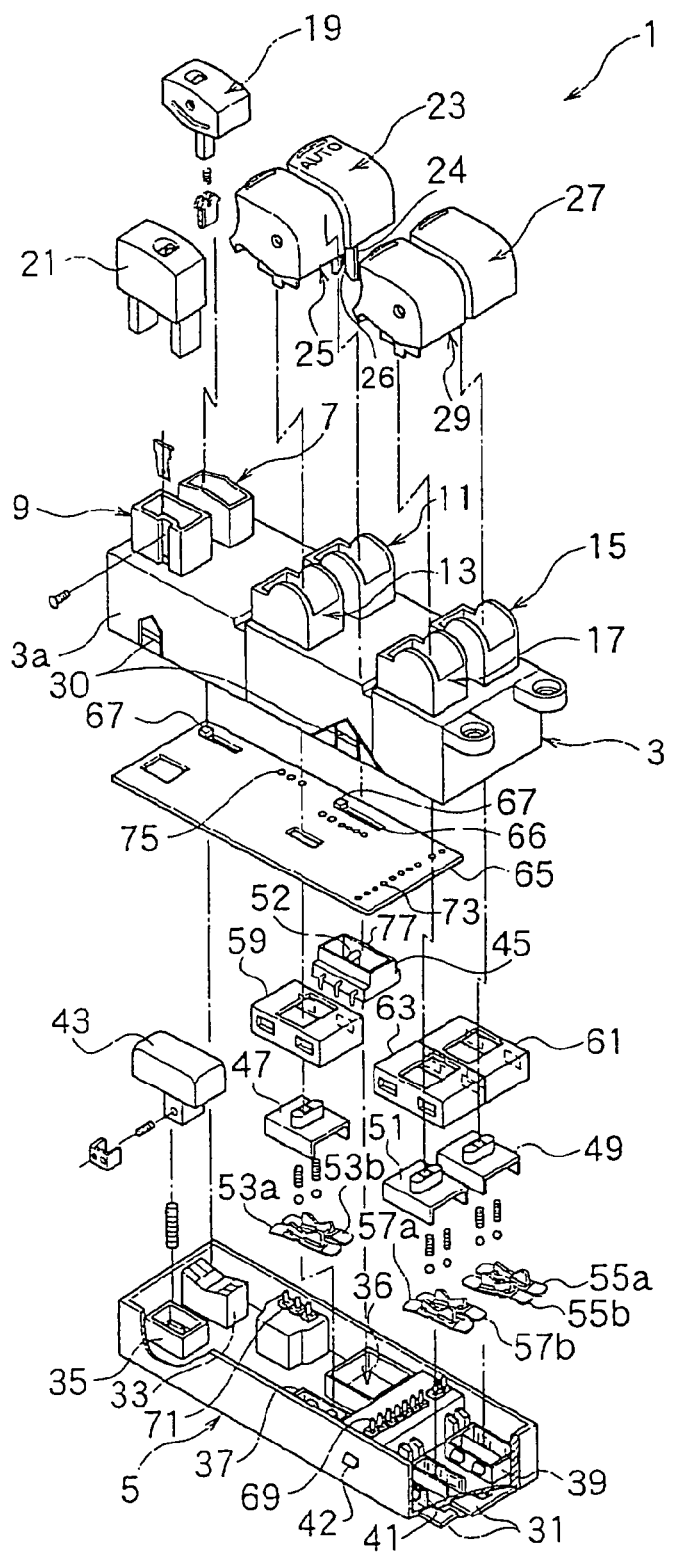
FIG. 1 is an exploded perspective view of a power window switch according to a first embodiment of the invention.

FIG. 1 is an exploded perspective view of a switch apparatus according to the first embodiment of the invention, the switch apparatus being, for example, a power window switch 1 for an automobile. The switch in FIG. 1 is a switch for a right-handed vehicle, and is provided on, for example, an armrest of a driver's seat or on a passenger room side of a vehicle door. Portions, locations, and orientations of the respective pads, which will be described later, are only exemplary in the accompanying drawings. The upward, downward, forward, rearward, rightward and leftward orientations of the respective structural members are different depending on the orientations in which the power window switch 1 for an automobile is mounted to the automobile, and are not limited to those shown in the drawings. The first embodiment will be described in detail with reference to the arbitrary states illustrated in the accompanying drawings.

The power window switch 1 for an automobile is provided with a case 3 and a terminal block 5. The case 3 and terminal block 5 are assembled together to form a housing for the switch apparatus.

The case 3 is in the shape of a box made of a resin material. The box-like case 3 is open at the bottom and has a plurality of knob-mounting portions 7, 9, 11, 13, 15, and 17 formed on the top surface of the case 3. The case 3 has left and right sidewalls 3a (FIG. 1 shows only the left sidewall). Each of the sidewalls is formed with two engagement windows 30 which detachably engage the terminal block 5. The knob-mounting portions 7, 9, 11, 13, 15, and 17 support operating knobs 19, 21, 23, 25, 27, and 29, respectively.

The operating knob 19 is used to lock the vehicle door and is journaled on a knob-mounting portion 7 formed on the case 3, so that the operating knob 19 can be operated in a rocking manner. The operating knob 21 operates as a part of a push-lock switch and is mounted to the knob-mounting portion 9 on the case 3 so that the operating knob 21 is movable upward and downward to lock the vehicle window.

The operating knob 23 is journaled on the knob-mounting portion 11 formed on the case 3 so that the operating knob 23 can be operated in a rocking manner to open and close the window on the driver's seat side. The operating knob 23 and a knob-leg 24 are formed of a resin material. The operating knob 23 and the knob-leg 24 are assembled integrally or formed in one-piece construction. The knob-leg 24 has a bifurcation 26 that engages a later-described mating element.

The operating knob 25 is journaled on the knob-mounting portion 13 formed on the case 3 so that the operating knob 25 can be operated in a rocking manner to open and close the window on the assistant's seat side. The operating knob 27 is journaled on the knob-mounting portion 15 formed on the case 3 so that the operating knob 27 can be operated in a rocking manner to open and close the window on the passenger seat side behind the driver's seat. The operating knob 29 is journaled on the knob-mounting portion 17 formed on the case 3 so that the operating knob 17 can be operated in a rocking manner to open and close the window on the passenger seat side behind the assistant's seat.

The terminal block 5 has a plurality of electrically conductive plates 31 insert-molded in the terminal blocks, the plates 31 being electrically continuous to terminals and fixed contacts. The terminal block 5 has a fixed-contact supporting portion 33 that corresponds to the operating knob 19; a wall 35 that corresponds to the operating knob 21; a wall 36 that corresponds to the operating knob 23; a wall 37 that corresponds to the operating knob 25; a wall 39 that corresponds to the operating knob 27; and a wall 41 that corresponds to the operating knob 29.

The wall 35 defines a space that receives a moving block 43 therein. The wall 36 defines a space that receives an auto switch 45 in the form of a slide switch. The walls 37, 39, and 41 define spaces that receive sliders 47, 49, and 51, respectively.

The auto switch 45 is received in a space defined by the wall 36, thereby being supported on the terminal blocks. The auto switch 45 has an operating boss 52 that engages the bifurcation 26 of the knob-leg 24. The operating boss 52 projects toward the knob-leg 24 so that the auto switch 45 is positioned face up.

The slider 47 is housed together with a pair of movable straps 53a and 53b in a space defined by the wall 37, and a slider cover 59 is detachably mounted to the wall 37. Likewise, the slider 49 is housed together with a pair of movable straps 55a and 55b in the space defined by the wall 39, and a slider cover 61 is detachably mounted to the wall 39. The slider 51 is also housed together with a pair of movable straps 57a and 57b in the space defined by the wall 41, and a slider cover 63 is detachably mounted to the wall

41. The operating knobs 25, 27, and 29 are operatively connected to the sliders 47, 49, and 511 respectively.

The terminal block 5 has two engagement projections 42 formed on each of left and right walls, the engagement projections 42 detachably engaging the engagement windows 30 formed in the case 3. It should be noted that FIG. 1 shows only one engagement projection 42 on the left wall.

The terminal block 5 supports a circuit board 65 thereon, which in turn supports a light emitting element (LED) 67 or a lamp as a light source thereon. The circuit board 65 fits to an upper opening formed in the terminal blocks. The circuit board 65 is formed with an elongated hole 66 through which the knob-leg 24 of the auto switch 23 extends.

Terminals 69 and terminals 71 project upwardly from the terminal block 5 and are inserted into through-holes 73 and the through-holes 75, respectively. The terminals 69 and the terminals 71 are soldered into the through-holes 73 and 75 so that the circuit board 65 is fixedly assembled to the terminal block 5.

Figure 2:
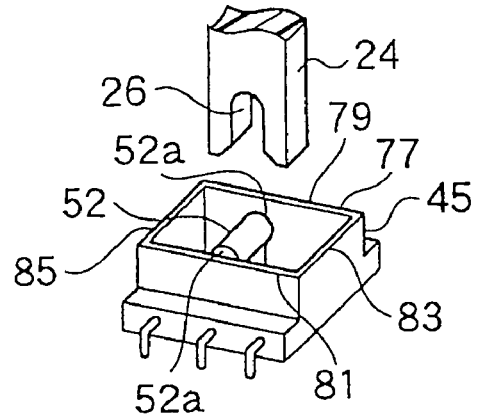
FIG. 2 is an exploded perspective view of a pertinent portion of the power window switch, illustrating the relation between an auto switch and a knob-leg according to the first embodiment.
Figure 3:
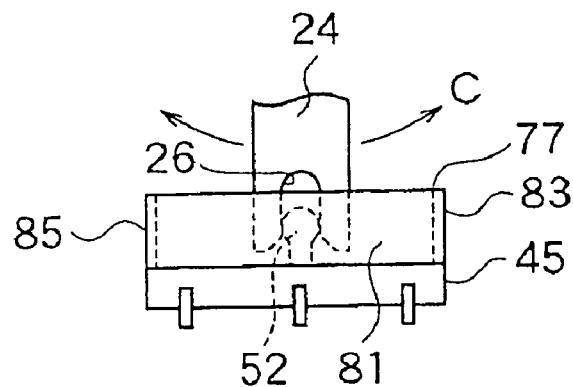
FIG. 3 is a side view of the pertinent portion, illustrating the auto switch and the knob-leg when they engage each other according to the first embodiment.
Figure 4:
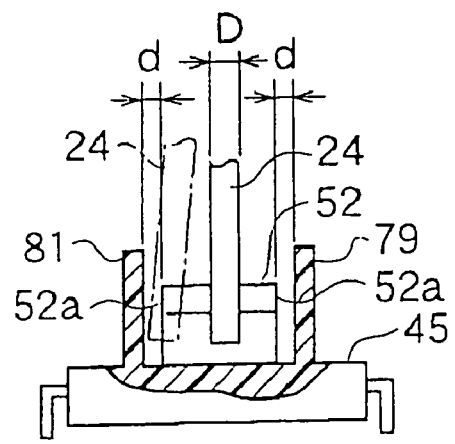
FIG. 4 is a front view (a part being cross-sectional view) of the pertinent portion, illustrating the auto switch and the knob-leg when they engage each other according to the first embodiment.

The relation between the auto switch 45 and the knob-leg 24 will be described in more detail with reference to FIGS. 2 to 4. FIG. 2 is an exploded perspective view of a pertinent portion, illustrating the relationship between the auto switch and the knob-leg. FIG. 3 is a side view of the pertinent portion, illustrating when the auto switch engages the knob-leg. FIG. 4 is a partially cross-sectional front view, illustrating when the auto switch engages the knob-leg.

The auto switch 45 has a surrounding wall 77 formed in one-piece construction, the surrounding wall 77 surrounding the operating boss 52. The surrounding wall 77 includes walls 79, 81, 83, and 85 having a height substantially the same as or higher than the operating boss 52. The walls 79 and 81 extend in directions parallel to a plane in which the knob-leg 24 pivots (in a direction shown by arrow C in FIG. 3), and oppose the ends 52a of the operating boss 52 to restrict the movement of the knob-leg 24 in a direction perpendicular to the wall. The walls 79 and 81 extend over the entire range over which the knob-leg 24 swings.

The wall 79 and the end 52a of the operating boss 52 are spaced apart by a distance d, and the wall 81 and another end 52a of the operating boss 52 are spaced apart by a distance d. The distance d is selected smaller than a thickness D of the knob-leg 24.

In assembling, the circuit board 65 is fitted to the opening of the terminal blocks. The terminals 69 and the terminals 71 are inserted into the through-holes 73 and through-holes 75, respectively, and soldered. The operating knobs 19, 21, 23, 25, 27, and 29 are supported on the knob-mounting portions 7, 9, 11, 13, 15, and 17, respectively, formed on the case 3, respectively. The case 3 is fitted over the terminal block 5 with the engagement windows 30 engaging the engagement projections 42 formed on the terminal block 5, thereby completing the assembly.

Upon completing the assembly, the knob-leg 24 of the operating knob 23 extends through the elongated hole 86 formed in the circuit board 65, and the bifurcation 26 of the knob-leg 24 engages the operating boss 52 of the auto switch 45, so that the auto switch 45 can be switched by operating the operating knob 23 in a rocking manner The operation of switching the switch apparatus will be described. When the operating knobs 23, 25, 27, and 29 are pulled up, the power window is raised. When the operating knobs 23, 25, 27, and 29 are pushed down, the power window is lowered. When the operating knob 23 is strongly pulled up or pushed down, the power window is raised or lowered automatically. When the operating knobs 23, 25, 27, and 29 are released after operation, the respective operating knobs return to their neutral positions where the operating knobs are in a standby state.

The pull-up operation and push-down operation of the operating knob 23 cause the knob-leg 24 to pivot in one of directions shown by arrow C as shown in FIG. 3, so that the operating boss 52 receives a force from the bifurcation 26. In this manner, the operating boss 52 moves operatively to switch the auto switch 45.

When the knob-leg 24 deforms due to, for example, warping as shown in dot-dash lines in FIG. 4 so that the knob-leg 24 shifts relative to the operating boss 52, the wall 81 as the limiting element abuts the knob-leg 24 to prevent the knob-leg 24 from further shifting. In the present embodiment, because the wall 79 is provided to oppose the wall 81, the wall 79 as the limiting element also abuts the knob-leg 24 to prevent the knob-leg 24 from further shifting when the knob-leg 24 deforms in the opposite direction.

Because the distance d between the wall 79 and the end 52a of the operating boss 52 and the distance d between the wall 81 and another end 52a are smaller than the thickness D of the knob-leg 24, the knob-leg 24 will not disengage from the operating boss 52 but remain in engagement with the operating boss 52 even when the knob-leg 24 abuts the wall 79 or the wall 81. Thus, the operation of the operating knob 23 provides smooth sliding switching operation of the auto switch 45.

The thickness D of the knob-leg 24 need not be selected in an attempt to increase rigidity to prevent the knob-leg from shifting from where it should engage the operating boss 52 but may be selected simply to satisfy the required relation between the thickness D of the knob-leg and the distance d. Therefore, the thickness D of the knob-leg 24 can be as thin as possible, so that the light emitted from the light emitting element (LED) 67 provided on the circuit board 65 is not likely to be blocked by the knob-leg 24 but transmits through the indicator on the operating knob 23 for sufficient illumination of the indicator. Therefore, the operating knob 23 may be visually recognized easily, for example, even at night.

In the present embodiment, because the operating boss 52 is surrounded by a surrounding wall 77 having a height equal to or higher than the operating boss 52, the operating boss 52 may be protected from external forces when the auto switch 45 is transported alone or when the auto switch 45 is assembled to the power window switch apparatus. The height of the surrounding wall 77 may be lower than the operating boss 52, providing that when the knob-leg 24 is at its maximum swing, the tip end of the knob-leg 24 is still within a space defined by the surrounding wall 77 to prevent the knob-leg 24 from disengaging from the operating boss 52.

In the first embodiment, the surrounding wall 77 as a limiting element is formed on the auto switch 45 to extend all around the operating boss 52 from above. Thus, even if the surrounding wall 77 has a small thickness, the surrounding wall 77 can be rigid enough as a whole. The limiting wall that surrounds the operating boss 52 is not limited to the continuous surrounding wall 77 but can be a combination of separate, opposing walls 79 and 81. Alternatively, only one of the walls 79 and 81 may be provided, in which case, the wall 79 or 81 reliably prevents the knob-leg 24 from disengaging the end 52a side of the operating boss 52. The distance d between the end 52a and the walls 79 and 81 need not be constant as shown in FIG. 4. Providing that the knob-leg 24 is prevented from disengaging from the engagement portion due to shifting, the distance d may be set to a specific value at a particular location on the walls 79 and 81 and then gradually varies with increasing distance from the particular location.

The operating boss 52 may have a flange or a projection that can engage one or both sides of the knob-leg 24. Additionally, the operating boss 52 may be formed with a circumferential groove, which receives the bifurcation 26 of the knob-leg 24 therein.

Second Embodiment

Figure 5:
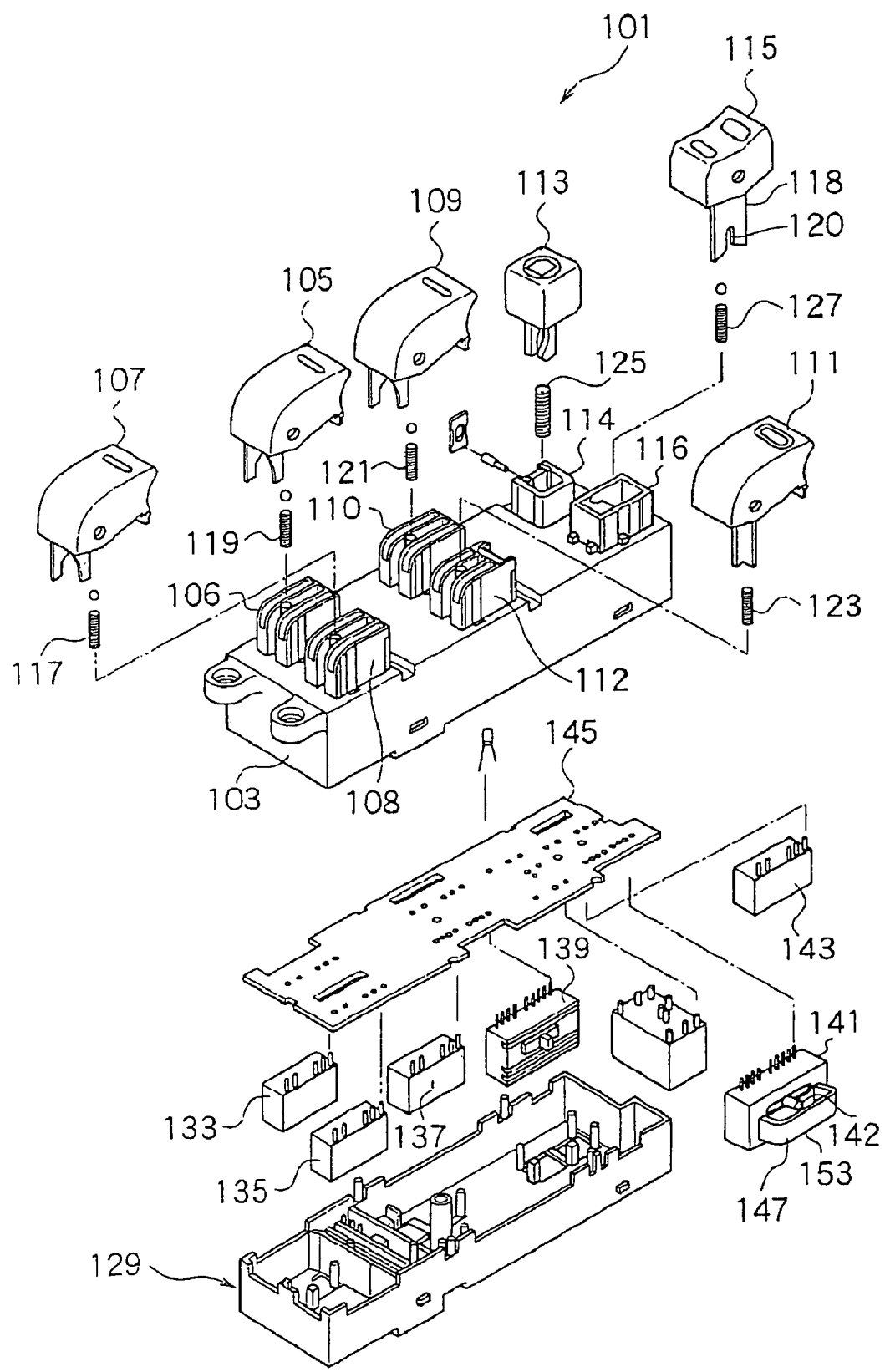
FIG. 5 is an exploded perspective view of a power window switch according to a second embodiment.

FIG. 5 is an exploded perspective view of a power window switch for an automobile, illustrating a switch apparatus according to a second embodiment.

Referring to FIG. 5, a power window switch 101 for an automobile includes a plurality of operating knobs 105, 107, 109, 111, 113, and 115 supported on the surface of a case 103 by means of springs 117, 119, 121, 123, 125, and 127, respectively.

The operating knob 115 corresponds to the operating knob 19 according to the first embodiment and is operated to lock the vehicle door. The operating knob 115 is journaled on a knob-mounting portion 116 formed on the case 103 so that the operating knob 115 can be operated in a rocking manner. The operating knob 115 and the knob-leg 118 are made of a resin material. They are assembled integrally or in one-piece construction. The knob-leg 118 has a bifurcation 120 for engaging a later-described element.

The knobs 105, 107, 109, 111, and 113 correspond to the operating knobs 29, 27, 25, 23, and 21, respectively, in this order, and are journaled on the knob-mounting portions 106, 108, 110, 112, and 114 formed on the case 103 so that the operating knob can be operated in a rocking manner.

The case 103 is fitted over a terminal block 129, which forms a housing together with the case 103.

The terminal block 129 supports module switches 133, 135, 137, 139, 141, and 143 thereon, which are connected in the electrical circuit formed on a circuit board 145 supported on a housing 131.

The module switch 141 has an operating pin 142 that engages the bifurcation 120 of the knob-leg 118. The operating pin 142 extends in a direction substantially perpendicular to a plane in which the knob-leg 118 swings, and the module 141 extends in a direction parallel to the plane.

Figure 6:
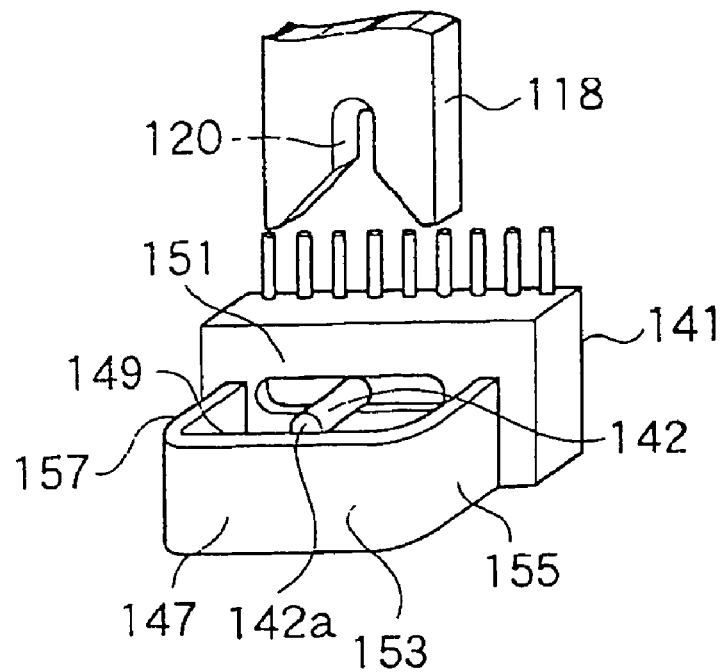
FIG. 6 is an exploded perspective view of a pertinent portion of the power window switch, illustrating the relationship between a module switch and the knob-leg according to the second embodiment.
Figure 7:
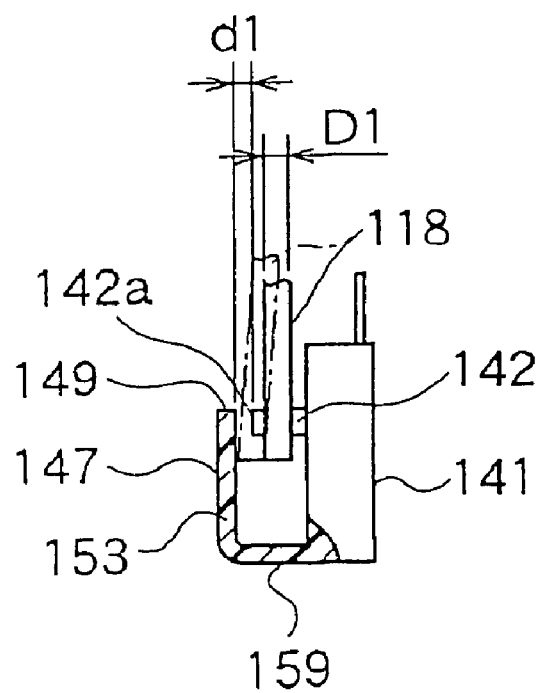
FIG. 7 is a side view (a part being cross-sectional view) of the pertinent portion of the second embodiment, illustrating the auto switch and the knob-leg when they engage each other.

FIGS. 6 and 7 illustrate the relation between the knob-leg 118 of the operating knob 115 and the module switch 141. FIG. 6 is an exploded perspective view of a pertinent portion, illustrating the relation between the module switch 141 and the knob-leg 118. FIG. 7 is a partially cross-sectional side view of the pertinent portion, illustrating the relation between the module switch 141 and the knob-leg 118.

The module switch 141 includes a surrounding wall 147 that is in one-piece construction with the module switch 141 and surrounds the operating pin 142. The upper end 149 of the surrounding wall 147 is as high as the operating pin 142 or higher than the operating pin 142. The surrounding wall 147 includes walls 153, 155, and 157 that stand against an outer wall 151 of the module switch 141 to surround the pin 142 from three directions, and a bottom 159 that closes the surrounding wall 147 at the bottom thereof, thereby providing sufficient rigidity of the wall 153. The wall 153 opposes the free end 142a of the operating pin 142 and extends in a plane substantially parallel to a direction in which the knob-leg 118 swings, thereby serving as a limiter or a stopper against the knob-leg 118. The wall 153 extends over the entire range over which the knob-leg 118 swings.

The distance d1 between the wall 153 and the end 142a of the operating pin 142 is smaller than the thickness D1 of the knob-leg 118.

The assembly and switching operation of the power window switch according to the second embodiment are much the same as those of the first embodiment.

When the driver operates the operating knob 115, the knob-leg 118 swings in a corresponding direction, so that the operating pin 142 receives a force from the bifurcation 120. This causes the operating pin 142 to operatively slide to switch the module switch 141.

If the knob-leg 118 deforms due, for example, to warping so that the knob-leg 118 shifts from where it should engage the operating pin 142 as depicted in dot-dash lines in FIG. 7, the knob-leg 118 abuts the wall 153 as a limiting wall that prevents the knob-leg 118 from further shifting relative to the operating pin 142.

Because the distance d1 between the wall 153 and the end 142a of the operating pin 142 is smaller than the thickness D1 of the knob-leg 118, the knob-leg 118 will not disengage from the end 142a of the operating pin 142 but remain engaged even when the knob-leg 118 deforms and abuts the wall 153. This ensures that the operating knob 115 is allowed to operate the module switch 141 in a sliding motion.

In the second embodiment, it is enough that the wall 153 is disposed to oppose the free end 142a of the operating pin 142. This structure further simplifies the construction of the power window switch.

The thickness D1 of the knob-leg 118 need not be selected in an attempt to increase rigidity to prevent the knob-leg 118 from shifting from where it should engage the operating pin 142, but should primarily be selected to satisfy the required relation between the thickness D1 of the knob-leg and the distance d1. Thus, the light emitted from the light emitting element (LED) 87 on the circuit board 145 is not likely to be blocked by the knob-leg 118 but transmits through the indicator on the operating knob 115 for sufficient illumination of the indicator, so that the operating knob 115 may be visually recognized easily, for example, even at night just as in the first embodiment.

In the second embodiment, too, because the operating pin 142 is surrounded by the surrounding wall 147, the operating pin 142 may be protected from external forces when the module switch 141 is transported alone, or when the module switch 141 is assembled to the power window switch apparatus.

The wall for limiting the deformation of the knob-leg is not limited to the surrounding wall 147 but may include only the walls 153 and 159 or the walls 153, 155, and 157. The wall may be designed in any form as long as the distance d1 between the wall 153 and the free end 142a of the operating pin 142 is maintained to be smaller than the thickness D1 of the knob-leg 118.

The second embodiment is not limited to what has been described above, and a modification such as those in FIGS. 8 and 9 is possible.

Figure 8:
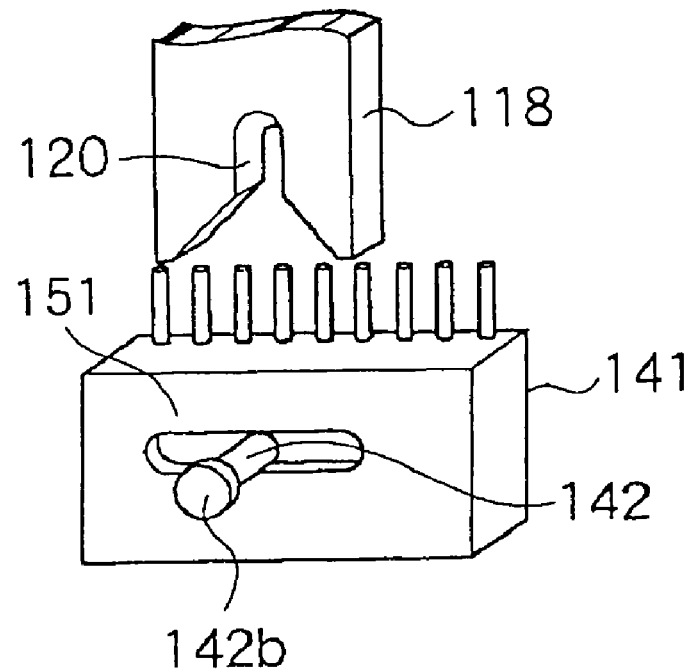
FIG. 8 is an exploded perspective view of a pertinent portion of a modification to the second embodiment, illustrating the relation between the module switch and the knob-leg.
Figure 9:
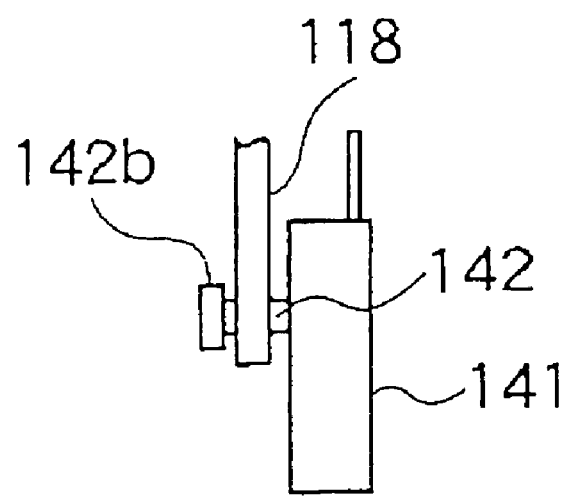
FIG. 9 is a side view of the pertinent portion of the modification to the second embodiment, illustrating the module switch and the knob-leg when they engage each other.
Figure 10:
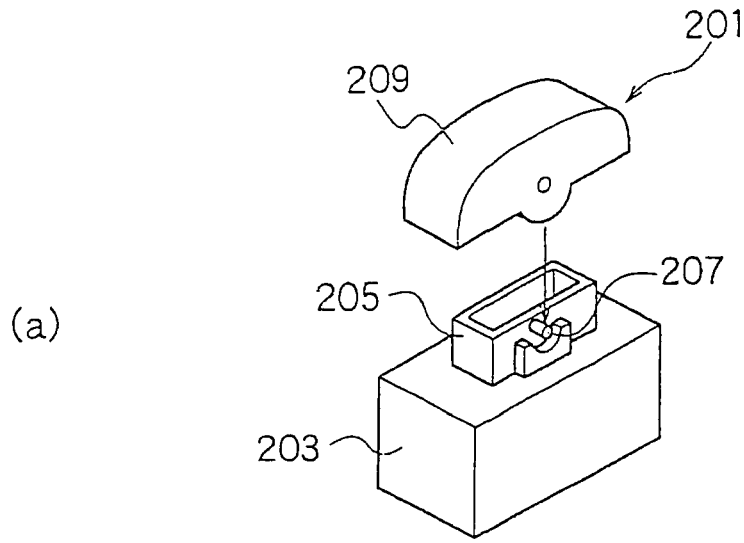
FIG. 10 illustrates a conventional switch apparatus, FIG. 10(a) being an exploded perspective view of the switch apparatus with some parts omitted, FIG. 10(b) being a side view, and FIG. 10(c) being a cross-sectional view taken along line SA—SA with some parts omitted.
Figure 10:
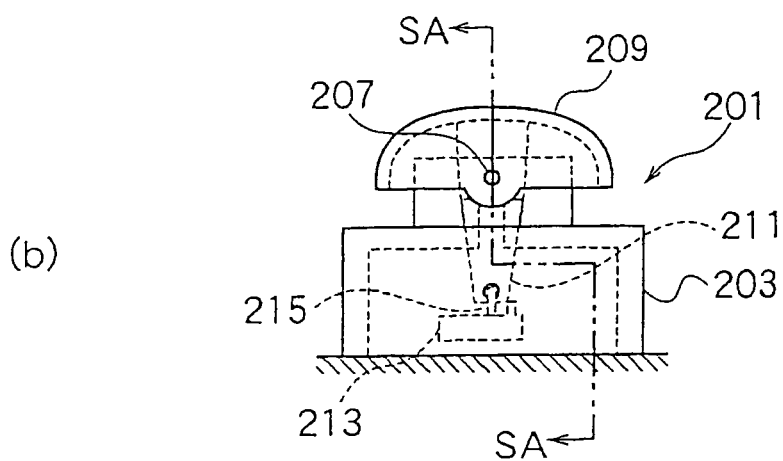
Figure 10:
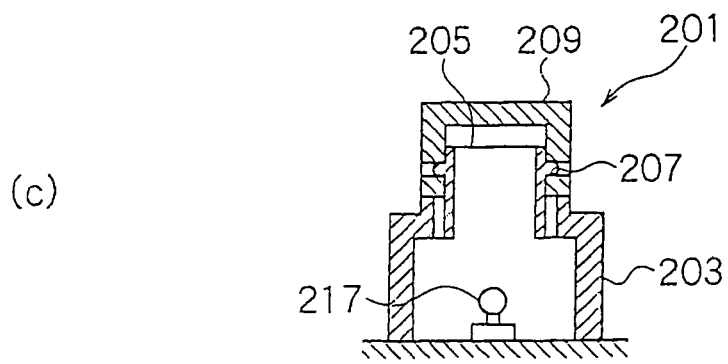
Figure 11:
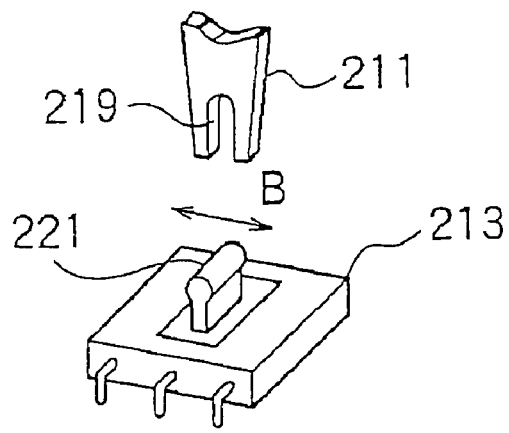
FIG. 11(a) is an exploded perspective view of a pertinent portion of the conventional switch apparatus shown in FIG. 10, illustrating the relation between a slide switch and a knob-leg, FIG. 11(b) being a side view of the pertinent portion and illustrating the engagement between the slide switch and the knob-leg, and FIG. 11(c) being a front view of the pertinent portion and illustrating the engagement between the slide switch and the knob-leg.
Figure 11:
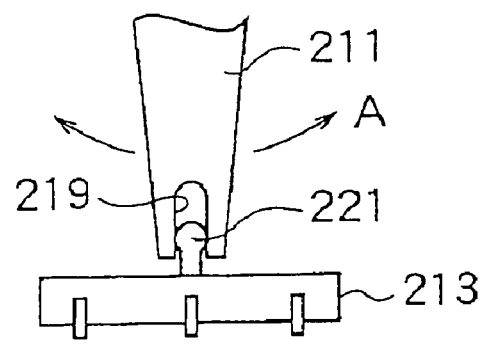
Figure 11:
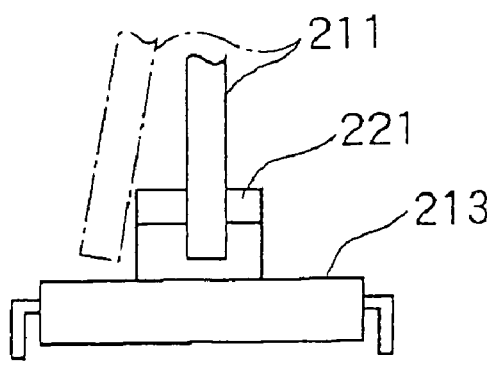

FIG. 8 is an exploded perspective view of a pertinent portion of a modification to the second embodiment, illustrating the relation between the module switch 141 and the knob-leg 118. FIG. 9 is a side view of the pertinent portion of the modification to the second embodiment, illustrating the module switch 141 and the knob-leg 118 when they engage each other. The overall structure is the same as that in FIG. 5 and therefore the detailed description thereof is referred to FIG. 5.

In the modification, as shown in FIGS. 8 and 9, the module switch 141 has not the limiting wall 147 but has a flange 142b formed at the free end of the operating pin 142, the flange 142b allowing the knob-leg 118 to remain in engagement with the operating pin 142.

The flange 142b extends all over the entire circumference of the operating pin 142 at the free end of the operating pin 142. Thus, when the knob-leg 118 deforms due to warping during operation of the operating knob 115 so that the knob-leg 118 shifts toward the free end of the operating pin 142 from where the knob-leg 118 should engage the operating pin 142, the knob-leg 118 abuts the flange 142b. This structure prevents the knob-leg 118 from disengaging from the free end of the operating pin 142 and maintains the knob-leg 118 in engagement with the operating pin 142. As a result, the modification to the second embodiment also provides the same advantages as the second embodiment Because the modification only employs the flange 142b formed at the free end of the operating pin 142, the modification simplifies the overall structure, reduces the overall weight, and facilitates the assembly of the apparatus.

The limiting wall according to the modification takes the form of the flange 142b that is formed at the free end of the operating pin 142 and extends all over the entire circumference of the operating pin 142. Any modification may be possible provided that the operating pin 142 remains in engagement with the knob-leg 118. For example, a projection(s) may be provided only on a particular part such as the free end of or left and right ends of or the upper part of the free end of the operating pin 142, or these projections may be combined. The operating pin 142 may have an engagement groove formed therein that engages the bifurcation 120 of the knob-leg 118, thereby preventing the knob-leg 118 from disengaging from the operating pin 142.

Although the embodiments of the invention have been described with reference to a switch in the form of a power window switch, the invention may be applied to other switches of various types.

The invention claimed is:

1. A switch apparatus, comprising:
    an operating knob having a knob-leg with a bifurcation formed in said knob-leg, the operating knob being supported so that the operating knob can be operated to rock; and
    a slide switch having an engagement portion insertable in the bifurcation formed in the knob-leg so as to engage the bifurcation;
    wherein when said operating knob is operated to rock, the engagement portion receives a force from the bifurcation through the rocking movement to operate the slide switch; and
    said slide switch has a limiting element that maintains the knob-leg in engagement with the engagement portion so that the knob-leg is prevented from disengaging from the engagement portion, wherein the limiting element is provided on the engagement portion.

2. The switch apparatus according to claim 1, wherein said limiting element is a flange provided on an end of said engagement portion.

3. The switch apparatus according to claim 2, wherein said flange extends over an entire circumference of the end of said engagement portion.

4. A switch apparatus, comprising:
    an operating knob having a knob-leg with a bifurcation formed in said knob-leg, the operating knob being supported so that the operating knob can be operated to rock; and
    a slide switch having an engagement portion insertable in the bifurcation formed in the knob-leg so as to engage the bifurcation;
    wherein when said operating knob is operated to rock, the engagement portion receives a force from the bifurcation through the rocking movement to operate the slide switch; and
    said slide switch has a limiting element that maintains the knob-leg in engagement with the engagement portion so that the knob-leg is prevented from disengaging from the engagement portion, wherein said limiting element is a flange provided on an end of said engagement portion.

* * * * *